United States Patent [19]

Nomiya et al.

[11] 3,854,059

[45] Dec. 10, 1974

[54] FLIP-FLOP CIRCUIT

[75] Inventors: Kosei Nomiya; Hiroto Kawagoe, both of Tokyo, Japan

[73] Assignee: Hitachi, Ltd., Tokyo, Japan

[22] Filed: Nov. 20, 1972

[21] Appl. No.: 307,786

[30] Foreign Application Priority Data

Nov. 19, 1971 Japan .............................. 46-92416

[52] U.S. Cl. ............ 307/304, 307/221 C, 307/238, 307/269, 307/279, 307/291

[51] Int. Cl. ...................... H03k 23/08, H03k 23/30

[58] Field of Search ........ 307/304, 279, 291, 221 C, 307/251, 238, 269

[56] References Cited

UNITED STATES PATENTS

| | | | |
|---|---|---|---|
| 3,513,329 | 5/1970 | Washizuka et al. | 307/304 |
| 3,578,984 | 5/1971 | Ryley | 307/304 |
| 3,586,875 | 6/1971 | Nicklas | 307/304 X |
| 3,600,609 | 8/1971 | Christensen | 307/279 |
| 3,657,570 | 4/1972 | Brink | 307/304 X |
| 3,702,945 | 11/1972 | Faith et al. | 307/304 X |
| 3,725,790 | 4/1973 | Ault et al. | 307/304 X |

*Primary Examiner*—Rudolph V. Rolinec
*Assistant Examiner*—William D. Larkins
*Attorney, Agent, or Firm*—Craig & Antonelli

[57] ABSTRACT

A flip-flop circuit formed of a combination of field effect transistors and in which input signals are controlled in the normal logic system by clock pulses of low level. A quasi-static operation is possible. A clock drive of the field effect transistors for loads is also possible.

10 Claims, 6 Drawing Figures

TABLE. 1

| CPx | VIN | $Q^{n+1}$ |
|---|---|---|
| 0 | 0 | $Q^n$ |
| 0 | 1 | $Q^n$ |
| 1 | 0 | 0 |
| 1 | 1 | 1 |

TABLE. 2

| S | R | $Q^{n+1}$ |
|---|---|---|
| 0 | 0 | $Q^n$ |
| 0 | 1 | 0 |
| 1 | 0 | 1 |
| 1 | 1 | 1 |

FLIP-FLOP CIRCUIT

The present invention relates to a flip-flop circuit, and more particularly to a flip-flop circuit composed gate-type field effect transistors.

An object of the present invention is to provide a flip-flop circuit which conforms to the normal logic system and which has a simple construction.

Another object of the present invention is to provide a flip-flop circuit which permits use of a clock drive of low signal level and which can operate at a low power consumption.

A further object is to provide a flip-flop circuit in which transmission of input signals or control signals is conducted by clock signals of low level, for example, logic level signals.

A still further object is to provide a flip-flop circuit enabling a quasi-static operation in which, in the case where a clock signal for transmitting an input signal or control signal is not generated, the previous state of the circuit is maintained.

A yet further object is to provide a D-type flip-flop circuit (delay type flip-flop circuit) and an R - S - S type flip-flop circuit (set-preference, set-reset, flip-flop circuit) which fulfill the conditions mentioned in the above objects.

The present invention will be described in detail hereunder with reference to the accompanying drawings, in which.

Figure 1:
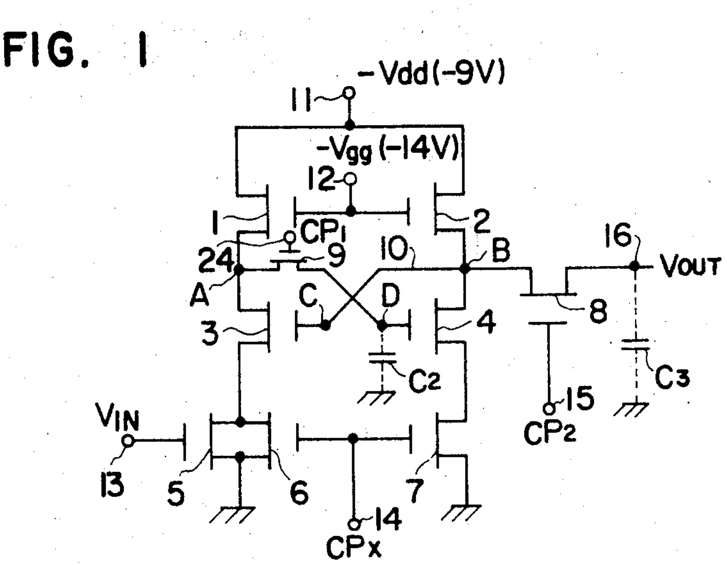
FIG. 1 is a schematic circuit diagram of a D-type flip-flop circuit of DC drive according to the present invention, in which Table 1 is the truth table of such D-type flip-flop circuit.

FIG. 1 shows a D-type flip-flop circuit according to the present invention. The flip-flop circuit is composed of nine MOS-type field effect transistors (hereinbelow abbreviated to MOST) 1–9, and is formed within a single semiconductor substrate in the embodiment. The MOST's 3 and 4 are cross-connected by a conductor 10 and the MOST 9. The MOST's 1 - 9 have control electrodes (gate electrodes), source electrodes and drain electrodes, respectively. The drains of the MOST's 3 and 4 are connected to a negative DC supply voltage $-V_{dd}$ through loads comprising the MOST's 1 and 2, respectively. Although a negative DC voltage $-V_{gg}$ is applied to the gates of the load MOST's 1 and 2, the above-mentioned DC voltage $-V_{dd}$ may also be applied. The source of the MOST 3 is connected through the MOST 5 or 6 to ground, while the source of the MOST 4 is connected through the MOST 7 to ground. It will be understood that the sources of the MOST's 3 and 4 are accordingly grounded in a state in which the MOST's 6 and 7 are rendered conductive. The gate of the MOST 5 is connected to an input terminal 13, into which an input signal $V_{in}$ is fed. The gates of the MOST's 6 and 7 are both connected to a terminal 14, to which a synchronizing signal or clock pulse $C_{px}$ is fed. The MOST 8 constitutes a transfer gate circuit for reading out an output signal from such a flip-flop circuit. In the case where a synchronizing signal $C_{p2}$ fed to the gate 15 of the MOST 8 is of a negative potential, the MOST 8 is rendered conductive to connect the drain terminal B of the MOST 4 to the output terminal 16.

The operating principle of the D-type flip-flop circuit illustrated in FIG. 1 will now be described.

In general, binary signals having two potential levels are applied to the input of a logic gate circuit. The present invention adopts the so-called normal logic system in which the higher potential level corresponds to the logic "1", while the lower one to the logic "0".

In case where, in FIG. 1, the synchronizing signal $C_{px}$ applied to the gates of the MOST's 6 and 7 is of the logic 0, namely, a negative potential, the MOST's 6 and 7 are rendered conductive, and accordingly, the sources of the MOST's 3 and 4 are grounded. Under this state, the flip-flop circuit maintains the previous state irrespective of whether the input signal $V_{in}$ is present or absent or whether its potential is positive or negative. That is, as indicated in Truth Table 1, when $C_{px}$ is of the logic state 0, output $Q^{n+1}$ holds the previous state $Q^n$ independently of the data $V_{in}$.

Figure 4:
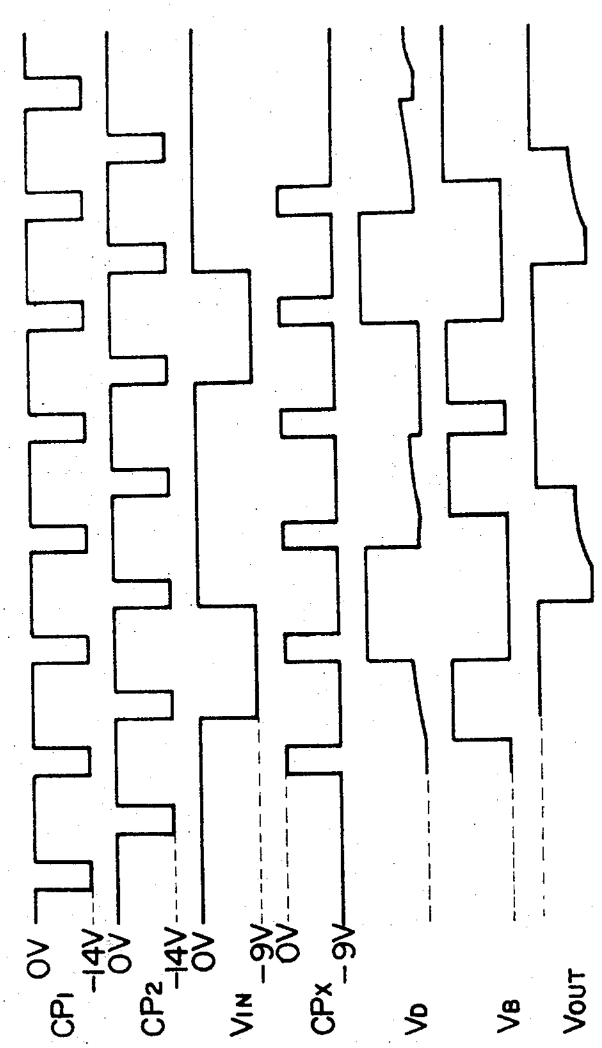
FIG. 4 is a time chart of the D-type flip-flop circuit in FIG. 1.

FIG. 4 is a time chart of voltage wave forms at various portions for explaining the operation of the flip-flop circuit in FIG. 1, and takes the time on the axis of abscissas and the potential on the axis of ordinates. Herein, the upper level represents zero volt, namely, the ground potential, while the lower level represents a negative potential.

As apparent from the chart, the clock pulses $C_{px}$ are consecutively generated for a fixed time. In other words, the signals of the logic 1 are fed to the terminal 14 for a fixed period. The input signals $V_{in}$ fed from the input terminal 13 during this period are read in. In the embodiment of FIG. 1, synchronizing signals $C_{p1}$ and $C_{p2}$ are shifted in phase by ½ period, the input signal $V_{in}$ is synchronized with $C_{p2}$, and the clock signal $C_{px}$ is synchronized with $C_{p1}$.

How the input signal $V_{in}$ is transferred in the flip-flop circuit in FIG. 1, will now be described with reference to Truth Table 1 and the time chart in FIG. 4.

In the case where the synchronizing signal $C_{px}$ is 1, that is, when the MOST's 6 and 7 are non-conductive (OFF), the synchronizing signal $C_{p1}$ is 0 and the MOST 9 is conductive. Therefore, the potential $V_D$ at point D depends on the state of the input signal $V_{in}$. More specifically, the MOST's 4 and 7 constitute a NOR circuit for the synchronizing signal $C_{px}$ and the potential $V_D$ of the point D. Since the synchronizing signal $C_{px}$ is 1, the potential $V_B$ at point B is 0, or is substantially the supply voltage $-V_{dd}$. Accordingly, the MOST 3 is in the conductive (ON) state, and the MOST 5 constitutes a NOT circuit. Herein, it will be understood that a potential at point A, namely, the potential at the point D, becomes $\overline{V_{in}}$ which is the reversed value of the input signal $V_{in}$. For example, assuming that the input signal $V_{in}$ is 1, the potential $V_D$ of the point D is 0, or the negative potential.

At the next moment, the synchronizing signal $C_{p1}$ becomes 1, the synchronizing signal $C_{px}$ becomes 0, and the connection between the points D and A is broken.

The potential $V_D$ of the point D or $\overline{V_{in}}$, however, is accumulated or stored by the gate - source capacity $C_2$ of the MOST 4. Since the input signal $V_{in}$ is shifted in phase with respect to the synchronizing signal $C_{px}$ by ½ period (½ bit) of the synchronizing signal, the potential $\overline{V_{in}}$ of the point D lags in phase over the input signal $V_{in}$ by ½ bit. Under the state under which $C_{px}$ is 0, the MOST's 6 and 7 turn on, and the MOST 4 constitutes a NOT circuit. Accordingly, the potential $V_B$ of the point B becomes equal to the potential $V_{in}$ with the potential $\overline{V_{in}}$ reversed. The potential $V_B$ is shifted in phase with respect to the input signal $V_{in}$ by ½ bit.

The potential $V_B$ of the point B is switched to the terminal 16, when the transfer gate MOST 8 turns on, namely, when the synchronizing signal $C_{p2}$ is 0. Herein, since the synchronizing signal $C_{p2}$ is shifted in phase with respect to the synchronizing signal $C_{p1}$ by ½ bit, an output potential $V_{out}$ appearing at the terminal 16 lags in phase with respect to the potential $V_B$ of the point B by ½ bit. That is, it becomes a value which corresponds to the input signal $V_{in}$ lagging in phase by 1 bit. The output potential $V_{out}$ can be stored in an electrostatic capacity $C_3$ in such a way that the terminal 16 is connected to a capacitive load having the electrostatic capacity $C_3$, for example, to the gate electrode of a MOSFET at the succeeding stage.

In accordance with the flip-flop circuit of the present invention shown in FIG. 1, as illustrated in the Truth Table 1 and the time chart in FIG. 4, when the synchronizing signal $C_{px}$ becomes 1, the input signal $V_{in}$ is read in, and the signal which corresponds to the input signal lagging by 1 bit is derived at the output. In the case where the synchronizing signal $C_{px}$ is 0, the output sustains the previous state irrespective of the input signal $V_{in}$. Herein, the synchronizing signal $C_{px}$ applied to the gates of the MOST's 6 and 7 which are connected in parallel with the MOST 5 may be of a small potential level, for example, the same level as the input signal $V_{in}$ (−9V).

The MOST 9 is connected between the points A and D in order that, when an input signal 1 is provided at the data read-in time, the state of the flip-flop circuit may be set.

Figure 2:
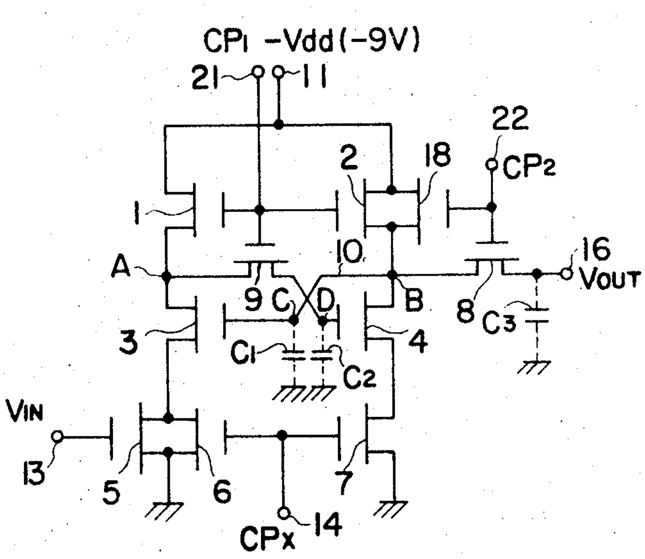
FIG. 2 is a schematic circuit diagram of a D-type flip-flop circuit of clock (AC) drive according to the present invention.

FIG. 2 shows another embodiment of the present invention in the case where the load MOST's 1 and 2 of the flip-flop circuit in FIG. 1 are clock-driven. The same parts as in FIG. 1 are designated by the same numerals or characters.

Referring to the figure, all the gates of the MOST's 1,2 and 9 are connected to a terminal 21, and have the clock pulses $C_{p1}$ supplied thereto. A MOST 18 is connected in parallel with the MOST 2, and has the clock pulses $C_{p2}$ supplied to its gate.

The truth table of the flip-flop circuit is the same as that of Table 1. The circuit operation is also substantially the same as that of the flip-flop circuit in FIG. 1. Since, however, the MOST 2 is subjected to the clock drive, a difference resides in the addition of the MOST 18. The MOST 18 functions to supply the power source voltage $-V_{dd}$ to the point B in case where the potential $V_B$ of the point B is fed to the terminal 16 under such condition that the transfer gate MOST 8 is turned on by the synchronizing signal $C_{p2}$ under the OFF state of the MOST 4. Without the MOST 18, there will be the fear that a phenomenon called "charge sharing" will arise in a manner to be described hereunder. If the MOST 4 is in the OFF state and the clock pulse $C_{p1}$ is subsequently brought into the ground potential, the potential of the point B reaches a potential $-V_o$ approximate to the supply voltage $-V_{dd}$, and is accumulated in a gate - source capacity $C_1$ of the MOST 3. Next, when the synchronizing signal $C_{p2}$ becomes negative to render the MOST 8 conductive, the value of the potential V of the terminal 16 is given by the following equation:

$$V = C_1/C_1 + C_3\,(-V_o)$$

It is accordingly feared that the absolute value of the output voltage V becomes small in comparison with $V_o$, and that the gate circuit being the succeeding stage cannot be satisfactorily driven or operated.

Figure 5:
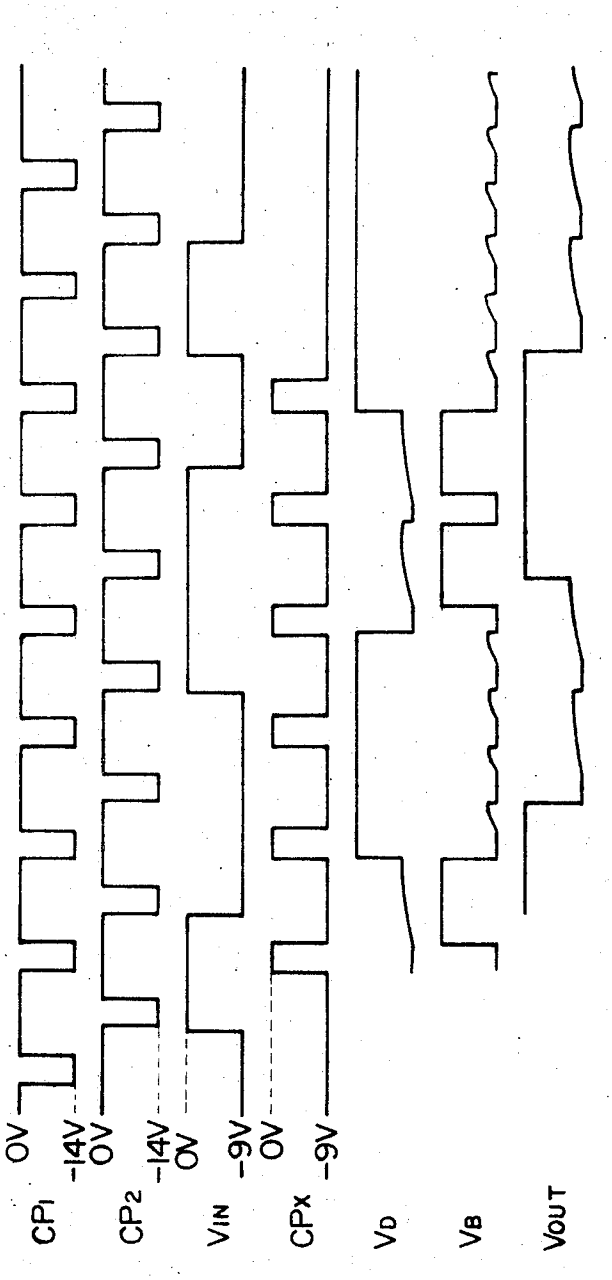
FIG. 5 is a time chart of the D-type flip-flop circuit in FIG. 2.

FIG. 5 is a time chart of voltage wave forms at various parts of the circuit for explaining the operation of the flip-flop circuit in FIG. 2. The relation between the input $V_{in}$ and the output $V_{out}$ is substantially the same as in the flip-flop circuit in FIG. 1. As will be understood, however, the power consumption of the flip-flop circuit in FIG. 2 is smaller than in the flip-flop circuit in FIG. 1 since the load MOST's are subjected to the clock drive.

Figure 3:
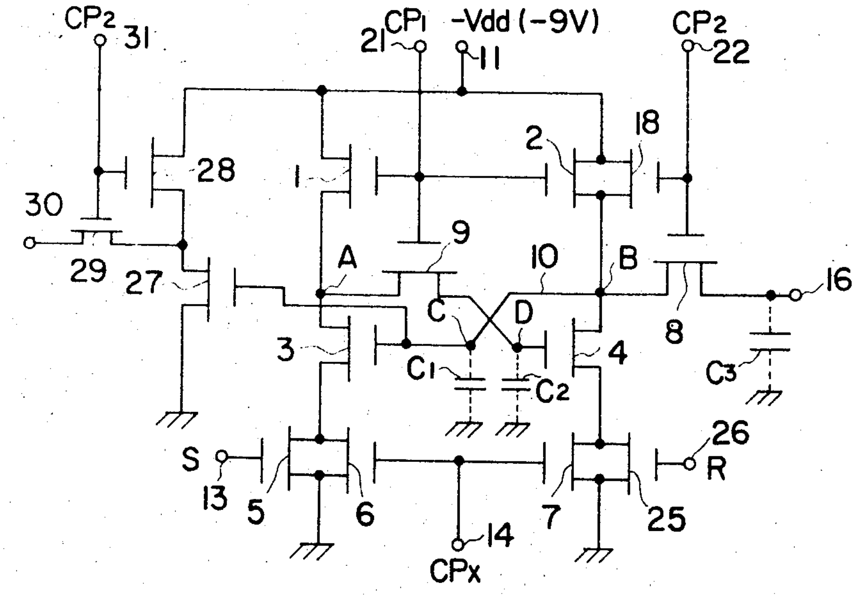
FIG. 3 is a schematic circuit diagram of an R - S - S type flip-flop circuit with a clock (AC) drive according to the present invention, in which Table 2 is the truth table of such R - S - S type flip-flop circuit.

FIG. 3 illustrates an R - S - S type flip-flop circuit according to the present invention. The same parts as in the flip-flop circuit in FIG. 2 are designated by the same numerals and characters.

Table 2 is the truth table of the R - S - S type flip-flop circuit. As apparent from the table, when the set input S and the reset input R are both 0, the output maintains the previous state. When the set input S is 0 and the reset input R is 1, the output becomes 0. When the set input S is 1, the output becomes 1 irrespective of the value of the reset input R.

Although the R - S - S type flip-flop circuit in FIG. 3 has substantially the same arrangement as the D-type flip-flop circuit in FIG. 2, it is different in that a MOST 25 for the reset input is added. The MOST 25 is connected in parallel with the MOST 7, and has its gate connected to a reset terminal 26. As stated previously, the MOST 18 serves to prevent the charge sharing phenomenon which arises at the clock drive of the MOST 2. It is accordingly unnecessary in case where the MOST 2 in FIG. 3 is driven with a DC voltage.

Figure 6:
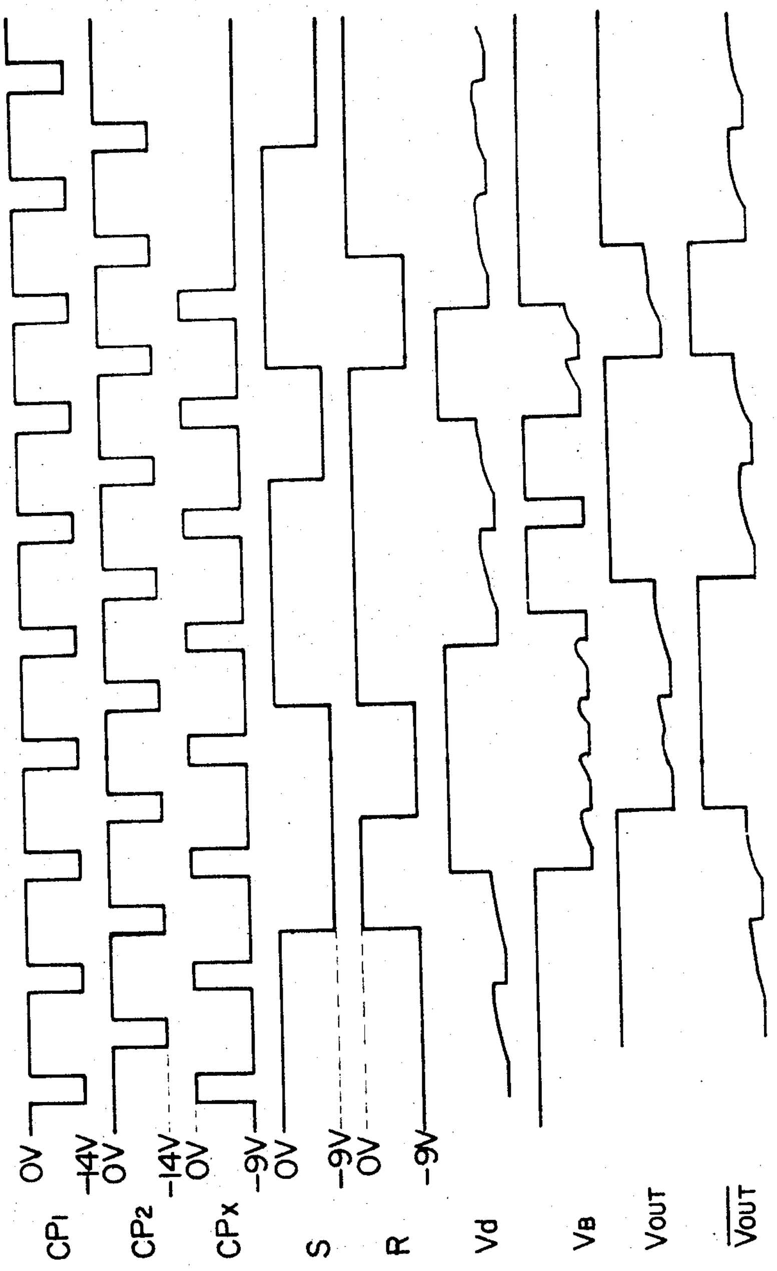
FIG. 6 is a time chart of the R - S - S type flip-flop circuit in FIG. 3.

The operation of the R - S - S type flip-flop circuit will now be described with reference to the time chart in FIG. 6.

When the synchronizing signal $C_{px}$ is 0, the MOST's 6 and 7 are turned on, and the state of the flip-flop circuit is constant irrespective of the values of the set input S and the reset input R. When, on the other hand, $C_{px}$ is 1, the MOST 's 6 and 7 are turned off, and as will be understood, the output potential $V_{out}$ of the terminal 16 depends on the set input S and the reset input R. The states of the output signal $V_{out}$ in relation to the set input S and the reset input R when $C_{px}$ is 1, will be described in detail hereunder in three stages.

a. In case where both the set signal S and the reset signal R are 0.

The MOST's 5 and 25 are rendered conductive, and the sources of the MOST's 3 and 4 are both grounded. Accordingly, the state of the flip-flop does not change, and the output $V_{out}$ is constant.

b. In the case where the set signal S is 0, while the reset signal R is 1.

The MOST 5 is rendered conductive, and the source of the MOST 3 is accordingly grounded. In contrast, the MOST 25 is rendered non-conductive and the source of the MOST 4 is accordingly opened. As a result, a voltage approximately equal to the supply voltage $-V_{dd}$ is applied to the point B, to render the MOST 3 conductive. The point A is accordingly brought into the ground potential. Further, the MOST 9 is kept conductive by the synchronizing signal $C_{p1}$. Therefore, the potential $V_D$ of the point D becomes ground. At the next moment, $C_{p1}$ becomes 1, and $C_{px}$ 0. Since, however, the MOST 9 is rendered non-conductive, the potential $V_D$ of the point D has the feedback path from the point A to the point D disconnected, and sustains the ground potential. Accordingly, the MOST 4 is rendered non-conductive; a voltage approximate to the supply voltage $-V_{dd}$ is supplied to the point B by the synchronizing signal $C_{p2}$; it is simultaneously supplied to the terminal 16; and the output $V_{out}$ becomes 0.

c. In the case where the set signal S is 1.

The MOST 5 becomes non-conductive. A voltage substantially equal to the supply voltage $-V_{dd}$ is applied to the points A and D by the synchronizing signal $C_{p1}$ independently of the reset signal R, and is accumulated in the capacity $C_2$ between the gate and source of the MOST 4. At the next moment, $C_{px}$ becomes 0 to render the MOST 7 conductive, and the MOST 4 is rendered conductive since the voltage approximate to the supply voltage $-V_{dd}$ is accumulated in the capacity $C_2$. Accordingly, the potential $V_B$ of the point B becomes ground potential. The output potential $V_{out}$ is also ground potential, namely 1 by the synchronizing signal $C_{p2}$. In FIG. 3, at terminal 16, output $\bar{Q}$ is derived from the point B through the MOST 8 and, at terminal 30, output Q is derived from the point B through inverter MOST's 27 and 28.

As described above, the D-type flip-flop circuit and the R - S - S type flip-flop circuit according to the present invention are simple in circuit arrangement. The control of an input signal can be conducted in the normal logic system by means of the clock pulse $C_{px}$ of low level, for example, logical level (the same extent of level as the input signal). By the addition of the MOST 18, it becomes possible to clock-drive the MOST's for loads.

What we claim is:

1. A flip-flop circuit comprising a first field effect transistor having a drain connected through first resistance means to a DC power source, a second field effect transistor having a drain connected through second resistance means to said DC power source, the gate of said first field effect transistor being connected to the drain of said second field effect transistor, a third field effect transistor, the gate of said second field effect transistor being connected to said drain of said first field effect transistor through said third field effect transistor, first synchronizing means connected to the gate of said third field effect transistor for applying a first clock pulse signal thereto which renders said third field effect transistor periodically conductive, fourth and fifth field effect transistors connected in parallel, the drains of said fourth and fifth field effect transistors being connected to the source of said first field effect transistor and the sources thereof being grounded, the gate of said fourth field effect transistor being connected to an input signal source, a sixth field effect transistor having a drain connected to the source of said second field effect transistor, the source of said sixth field effect transistor being grounded, and second synchronizing means connected to the gates of said fifth and sixth field effect transistors for applying a second clock pulse signal thereto which renders said fifth and sixth field effect transistors non-conductive when said third field effect transistor is conductive and an input signal is received from said input signal source.

2. A flip-flop circuit according to claim 1, wherein said first and second resistance means are seventh and eighth field effect transistors, respectively.

3. A flip-flop circuit according to claim 1, wherein said input signal source and said second synchronizing signal source provide signals at substantially the same voltage levels.

4. A semiconductor device according to claim 1, wherein said drain of said second field effect transistor is connected to one of the source or drain of a ninth field effect transistor whose gate is connected to a third synchronizing signal source.

5. A flip-flop circuit according to claim 2, wherein the source, drain and gate of said seventh field effect transistor are respectively connected to said drain of said first field effect transistor, said DC power source means and said first synchronizing means, and wherein the source, drain and gate of said eighth field effect transistor are respectively connected to said drain of said second field effect transistor, said DC power source and said first synchronizing means, and further including a tenth field effect transistor having a gate connected to a third synchronizing means for applying a third clock pulse signal thereto which renders said tenth field effect transistor periodically conductive, said tenth field effect transistor being connected in parallel with said eighth field effect transistor.

6. A flip-flop circuit comprising a first field effect transistor having a drain connected through first resistance means to a DC power source, a second field effect transistor having a drain connected through second resistance means to said DC power source, the gate of said first field effect transistor being connected to the drain of said second field effect transistor, a third field effect transistor, the gate of said second field effect transistor being connected to said drain of said first field effect transistor through said third field effect transistor, first synchronizing means connected to the gate of said third field effect transistor for applying a first clock pulse signal thereto which renders said third field effect transistor periodically conductive, fourth and fifth field effect transistors connected in parallel, the drains of said fourth and fifth field effect transistors being connected to the source of said first field effect transistor and the sources thereof being grounded, the gate of said fourth field effect transistor being connected to a first control signal source, sixth and seventh field effect transistors having drains connected to the source of said second field effect transistor and the sources thereof being grounded, the gate of said seventh field effect transistor being connected to a second control signal source, and second synchronizing means connected to the gates of said fifth and sixth field effect transistors for applying a second clock pulse signal thereto which renders said fifth and sixth field transistors nonconductive when said third field effect transistor is conductive and a first control signal is received from said first control signal source.

7. A flip-flop circuit according to claim 6, wherein said first and second resistance means are eighth and ninth field effect transistors, respectively.

8. A flip-flop circuit according to claim 6, wherein said first control signal source and said second synchronizing means provide respective signals at substantially the same voltage levels.

9. A semiconductor device according to claim 6, wherein said drain of said second field effect transistor is connected to one of the source or drain of a tenth field effect transistor, third synchronizing means for applying a third clock pulse signal to the gate of said tenth field effect transistor which renders said tenth field effect transistor periodically conductive.

10. A flip-flop circuit according to claim 7, wherein the source, drain and gate of said eighth field effect transistor are respectively connected to said drain of said first field effect transistor, said DC power source and a said first synchronizing means, and wherein the source, drain and gate of said ninth field effect transistor are respectively connected to said drain of said second field effect transistor, said DC power source and said first synchronizing means source, and further including an eleventh field effect transistor having a gate connected to said third synchronizing means, which eleventh field effect transistor is connected in parallel with said ninth field effect transistor.

* * * * *